United States Patent
Clement et al.

(10) Patent No.: US 12,086,268 B2
(45) Date of Patent: Sep. 10, 2024

(54) CONSTRAINED DECODING FOR SOURCE CODE GENERATION

(71) Applicant: MICROSOFT TECHNOLOGY LICENSING, LLC., Redmond, WA (US)

(72) Inventors: Colin Bruce Clement, Seattle, WA (US); Shao Kun Deng, New York City, NY (US); Xiaoyu Liu, Sammamish, WA (US); Neelakantan Sundaresan, Bellevue, WA (US); Alexey Svyatkovskiy, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 250 days.

(21) Appl. No.: 17/688,833

(22) Filed: Mar. 7, 2022

(65) Prior Publication Data

US 2023/0281318 A1    Sep. 7, 2023

(51) Int. Cl.
| | |
|---|---|
| *G06F 21/00* | (2013.01) |
| *G06F 8/41* | (2018.01) |
| *G06F 8/73* | (2018.01) |
| *G06F 21/57* | (2013.01) |
| *G06N 3/047* | (2023.01) |

(52) U.S. Cl.
CPC .............. *G06F 21/577* (2013.01); *G06F 8/42* (2013.01); *G06F 8/73* (2013.01); *G06N 3/047* (2023.01)

(58) Field of Classification Search
CPC . G06F 21/577; G06F 8/42; G06F 8/73; G06F 8/33; G06F 8/30; G06N 3/047
See application file for complete search history.

(56) References Cited

U.S. PATENT DOCUMENTS

| | | | |
|---|---|---|---|
| 11,175,897 B1 | 11/2021 | Deng et al. | |
| 2013/0091541 A1* | 4/2013 | Beskrovny | G06F 11/3688 726/1 |
| 2018/0115551 A1* | 4/2018 | Cole | H04L 47/783 |
| 2021/0034335 A1* | 2/2021 | Svyatkovskiy | G06F 8/33 |
| 2021/0263732 A1* | 8/2021 | Luo | G06F 8/77 |

(Continued)

FOREIGN PATENT DOCUMENTS

WO    2021021322 A2    2/2021

OTHER PUBLICATIONS

Feist et al., "Slither: A Static Analysis Framework for Smart Contracts", 2019 IEEE/ACM 2nd International Workshop on Emerging Trends in Software Engineering for Blockchain (WETSEB) (Year: 2019).*

(Continued)

*Primary Examiner* — Morshed Mehedi

(57) ABSTRACT

A constrained decoding technique incorporates token constraints into a beam search at each time step of a decoding process in order to generate viable candidate sequences that are syntactically and semantically correct. The token constraints identify source code tokens or sequences of tokens that should appear in a candidate sequence. The token constraints are generated from checking whether a token predicted at each decoding step is feasible for a partial solution based on the production rules of the grammar of the programming language, the syntactic correctness of a partial sequence, and/or static type correctness.

20 Claims, 9 Drawing Sheets

(56) References Cited

U.S. PATENT DOCUMENTS

2022/0046057 A1* 2/2022 Kutt ................. H04L 63/145
2022/0083450 A1* 3/2022 Geddes ................. G06F 21/57

OTHER PUBLICATIONS

Harwell, et al., "Roslyn", Retrieved From: https://github.com/dotnet/roslyn, Dec. 15, 2021, 4 Pages.

Hokamp, et al., "Lexically Constrained Decoding for Sequence Generation Using Grid Beam Search", in Proceedings of the 55th Annual Meeting of the Association for Computational Linguistics, Jul. 30, 2017, pp. 1535-1546.

Post, et al., "Fast Lexically Constrained Decoding with Dynamic Beam Allocation for Neural Machine Translation", in Proceedings of the Conference of the North American Chapter of the Association for Computational Linguistics: Human Language Technologies, vol. 1 (Long Papers), Jun. 1, 2018, pp. 1314-1324.

Shi, et al., "InferSharp", Retrieved From: https://github.com/microsoft/infersharp, Nov. 11, 2021, 4 Pages.

Svyatkovskiy, et al., "Intellicode Compose: Code Generation Using Transformer", in Proceedings of the 28th ACM Joint Meeting on European Software Engineering Conference and Symposium on the Foundations of Software Engineering, Nov. 8, 2020, pp. 1433-1443.

Vaswani, et al., "Attention Is All You Need", in Repository of arXiv:1706.03762v5, Dec. 6, 2017, 15 Pages.

Allamanis, et al., "A Survey of Machine Learning for Big Code and Naturalness", in Journal of ACM Computing Surveys, vol. 51, Issue 4, Article No. 81, Jul. 31, 2018, 37 Pages.

Le, et al., "Deep Learning for Source Code Modeling and Generation: Models, Applications and Challenges", in Repository of arXiv:2002.05442v1, Feb. 13, 2020, 37 Pages.

"International Search Report and Written Opinion issued in PCT Application No. PCT/US22/051303", Mailed Date: Feb. 24, 2023, 12 Pages.

* cited by examiner

CONSTRAINED DECODING FOR SOURCE CODE GENERATION

BACKGROUND

Machine learning is used to perform a variety of tasks that predict an output sequence of data given an input sequence of data. For source code generation, the input sequence represents the context of a partially-formed source code snippet and a machine learning model predicts or generates a candidate sequence that completes the partially-formed source code snippet.

The machine learning model generates a probability distribution across a vocabulary of source code tokens which is decoded into partial solutions until one or more candidate sequences are generated. Decoding the most likely candidate sequences is a search process through all the partial solutions that are possible. The search process is intractable since it grows exponentially. Heuristic search methods, such as a beam search, are often used to generate the partial solutions and final candidate sequences.

The beam search uses the probability distributions generated by a decoder to identify the top source code tokens likely to be the next source code token in a partial solution. The beam search expands the search by expanding the partial solutions with the source code tokens identified by the probability distribution having the highest probabilities. The search continues expanding the set of partial solutions from the top source code tokens identified by the model's probability distributions until the search ends.

At times, the beam search does not always generate syntactically and semantically correct source code. The beam search relies on the output probabilities generated from the decoder that may not always be perfectly calibrated for a target source code program or machine learning task. This results in the beam search generating source code that is not viable for a source code program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A constrained decoding technique incorporates token constraints into a beam search at each iteration of a decoding process in order to generate viable candidate sequences that are syntactically and semantically correct. The token constraints identify required source code tokens, sequences of tokens, or token values that should appear in a partial solution and ultimately in a candidate sequence. The token constraints are generated from checking whether a partial solution predicted at each decoding step is feasible based on the production rules of the grammar of the programming language, the syntactic correctness of a partial solution, semantic constraints, and/or static type correctness. A partial solution having most of the token constraints is output as a candidate sequence. A post-processing engine tests the candidate solutions for syntactic correctness and error vulnerability and eliminates those candidate solutions which are not likely to be useful.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

A constrained decoding technique is disclosed that incorporates token constraints at each time step of a decoding process in order to generate viable candidate sequences that are syntactically and semantically correct. The token constraints identify source code tokens or sequences of tokens that should appear in a candidate sequence. The token constraints are generated from checking whether a token predicted at each decoding step is feasible for a partial solution based on the production rules of the grammar of the programming language of the program, the syntactic correctness of the partial solution, semantic constraints, and/or static type correctness. In this manner, the token constraints prune a search space to more viable candidate sequences thereby conserving computing resources and developer time.

In one aspect, the constrained decoding technique is utilized in a code generation system, such as without limitation, a code completion system. Code completion tracks the characters that are input into a source code editor and predicts candidate sequences to complete the source code construct (i.e., line of code, method invocation, method name, variable name, etc.) based on the current context of the source code in the editor.

A beam search is used to generate the partial solutions and ultimately, the candidate sequences. The beam search uses the top k tokens, identified from each iteration of the neural transformer model, to expand a partial solution with a next token likely to complete a source code fragment. The beam search generates a search tree but only keeps the top k nodes at each inference level to expand the search. The search ends when a termination condition is met and the partial solution is deemed a candidate sequence.

The beam search relies on the decoder's output probabilities. The decoder is trained to generate the output probabilities based on minimizing a cross entropy loss which is not always perfectly calibrated to source code quality criteria, such as syntactic, semantic and type correctness. This leads to potentially buggy code and security vulnerabilities exposed by the candidate sequences.

In order to compensate for this limitation, the constrained decoding technique infers constraints based on static code analyses at each time step, to select the next token, in addition to the output probabilities, to add to a partial solution that more likely leads to a candidate sequence. The candidate sequences are then analyzed for syntactic correctness and error vulnerabilities. Those candidate sequences that pass these tests are then output in a ranked order.

Attention now turns to a more detailed description of the system, components, devices, and methods for syntactic and semantic aware constrained decoding.

System

Figure 1:
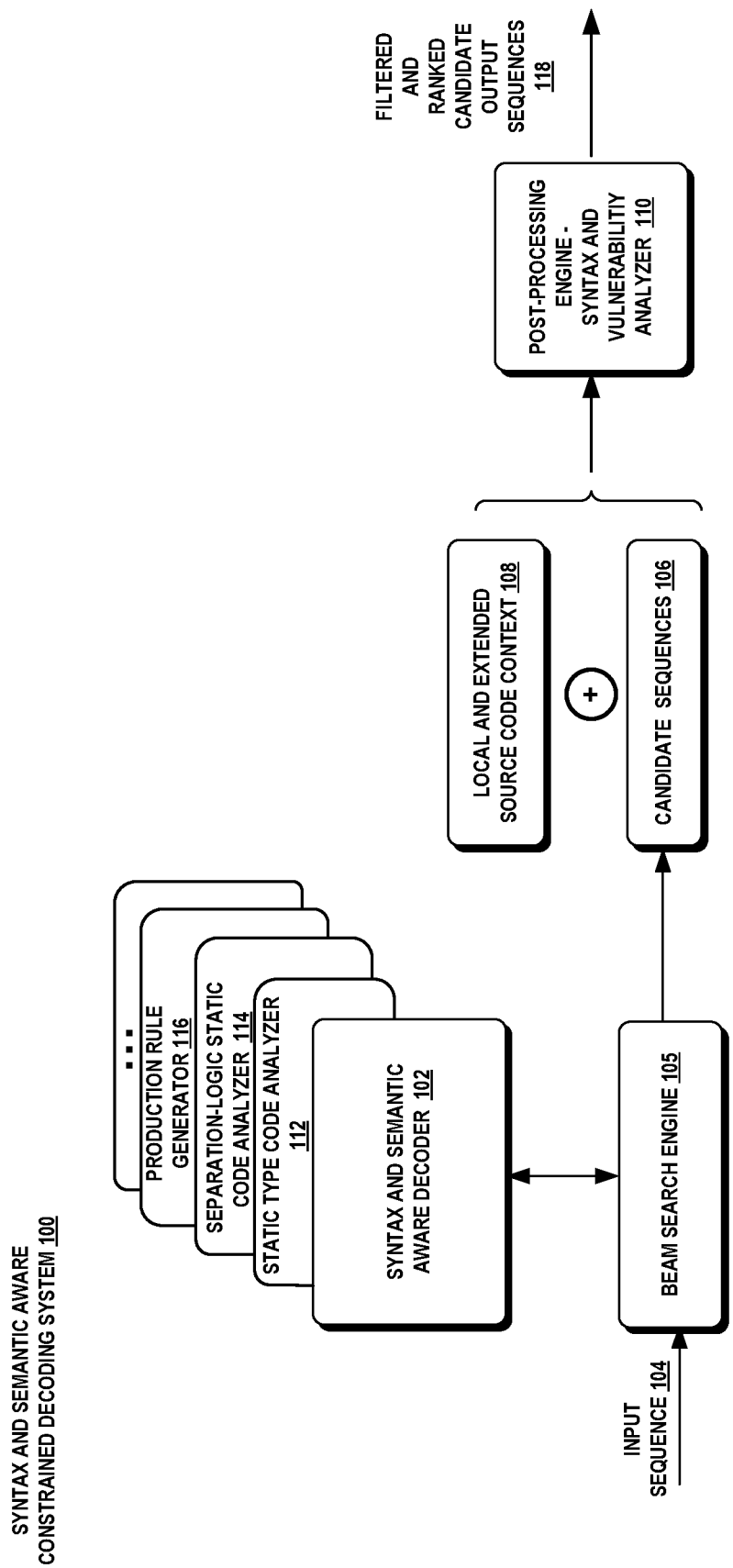
FIG. 1 is a schematic diagram illustrating an exemplary embodiment of a constrained decoding system for source code generation.

FIG. 1 illustrates an exemplary system 100 for syntactic and semantic aware constrained decoding. The system 100 includes a syntactic and semantic aware decoder 102, a beam search engine 105, a static type code analyzer 112, separation-logic static code analyzer 114, production rule generator 116 and a post processing engine/syntax and error vulnerability analyzer 110. The decoder 102 processes an input sequence of token embeddings 104 to predict candidate sequences 106. The syntax and error vulnerability analyzer 110 then analyzes the candidate sequences 106 within its local and extended source code context 108 for syntactic correctness and error vulnerabilities. Those candidate sequences that fail the analyses are filtered and the remaining candidate sequences 118 are ranked by a code quality score.

The syntax and semantic aware decoder 102 receives an input sequence that represents the context of a source code fragment for which candidate sequences are generated. In one aspect, the decoder 102 is trained to complete a partially-formed source code snippet and receives as input the context of the partially-formed source code snippet. The decoder 102 predicts the candidate sequences 106 most likely to complete the partially-formed source code snippet.

In another aspect, the decoder 102 is part of a sequence-to-sequence model that is trained to translate an input sequence of one domain into an output sequence of another domain. For example, the sequence-to-sequence model may translate a source code fragment written in a first programming language (i.e., first domain) into a corresponding source code fragment in a different programming language (i.e., second domain), translate a docstring of a method (i.e. first domain) into the corresponding method body (i.e., second domain), and translate a method signature (i.e., first domain) into a corresponding test case (i.e., second domain).

The syntax and semantic aware decoder 102 receives token constraints generated by one or more static analysis tools, such as a static type code analyzer 112, a separation-logic static code analyzer 114, and a production rule generator 116. A static type code analyzer 112 analyzes a code fragment to determine the types used in the code fragment. A type is the data type that represents the object-oriented class associated with a program construct (e.g., a variable, method, etc.). Examples of a static type code analyzer 112 includes Microsoft®'s Intellisense.

The separation-logic static code analyzer 114 analyzes the program code without executing the program and is an interprocedural static analyzer. An example of a separation-logic static code analyzer 114 is Facebook's Infer. An intraprocedural analysis differs since it is performed within a method, otherwise referred to as a procedure or function. An interprocedural static analysis spans multiple files or methods, including all the methods in the entire program. An interprocedural static code analysis is able to detect memory safety faults or bugs that span multiple files or methods, such as null pointer dereferencing and memory leaks, which would be missed if intraprocedural static analysis were used. An interprocedural static code analyzer, such as Infer, is based on separation logic that performs Hoare-logic reasoning about programs that mutate data structures. Infer uses the analysis language, Smallfoot Intermediate Language (SIL), to represent a program in a simpler instruction set that describes the program's actions on a symbolic heap. Infer symbolically executes the SIL commands over a symbolic heap according to a set of separation logic proof rules in order to discover program paths with the symbolic heap that violate heap-based properties.

It should be noted that SIL differs from intermediate languages, such as CIL, that represent instructions that can be transformed into native code. SIL instructions are used for a symbolic execution which is a logic-based proof analysis. The SIL instructions are not constructed to be executed on a processor or CPU such as the CIL instructions.

The production rule generator 116 relies on the production rules of the grammar of a programming language to predict the syntactically-correct code to complete a partially-written code snippet. A context-free programming language relies on its context-free grammar to describe how to construct syntactically-correct source code. A context-free grammar, G, is defined by a 4-tuple, $G=(V, T, R, S)$, where V is the set of non-terminal symbols, T is the set of terminal symbols, R is the set of production rules of the grammar, and S is the start non-terminal symbol used to represent the entire program. A terminal symbol is a symbol that appears in the strings generated by the grammar. A terminal symbol never appears on the left-hand side of a production rule and is always on the right-hand side. A non-terminal symbol is a placeholder for patterns of symbols that can be generated by the non-terminal symbols. A non-terminal symbol always appears on the left-side of a production rule. A production rule is a rule for replacing a non-terminal symbol. A grammar is context-free if a production rule can be applied regardless of the context of a non-terminal.

The syntax and error vulnerability analyzer 110 reviews the candidate sequences 106 for syntactic correctness and an error vulnerability. A software vulnerability is a flaw in a program resulting from a weakness that can cause a negative impact in the executing program, such as security violations. Software vulnerabilities include resource leaks, memory leaks, null pointer dereferences, and concurrency errors, which are difficult to detect deterministically.

Attention now turns to a discussion of the different configurations of the syntax and semantic aware decoder.

Neural Transformer Architecture

In one aspect, the syntax and semantic aware decoder 102 is configured as a neural transformer model with attention. Neural transformers with attention are one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence.

In one aspect, the syntax and semantic aware decoder is configured as a neural transformer model with attention configured with only decoder blocks and in another aspect, the decoder may be part of an encoder-decoder configuration of a neural transformer model where the decoder is coupled with a neural encoder transformer with attention.

The decoder-only neural transformer model is an auto-regressive model that produces an output one element at a time based on the outputs of the previous time steps. Code completion is best suited for a decoder neural transformer model since it is an auto-regressive task that predicts an ordered sequence of tokens where the order depends on the preceding tokens in the sequence.

The decoder model predicts a sequence of response tokens/subtokens, $m_t$, t=0 ... N, conditioned on an ordered sequence of tokens/subtokens $c_t$, t=0 ... T, corresponding to a context of a code fragment C as the product of conditional probabilities by estimating a conditional probability distribution P(Output|Input) as follows:

$$P(m_0, m_1, \ldots, m_N | c_0, c_1, \ldots, c_T) = \Pi_{i=1}^{N} P(m_i | c_0, c_1, \ldots, c_T, m_0, \ldots, m_{i-1}).$$

Figure 2:
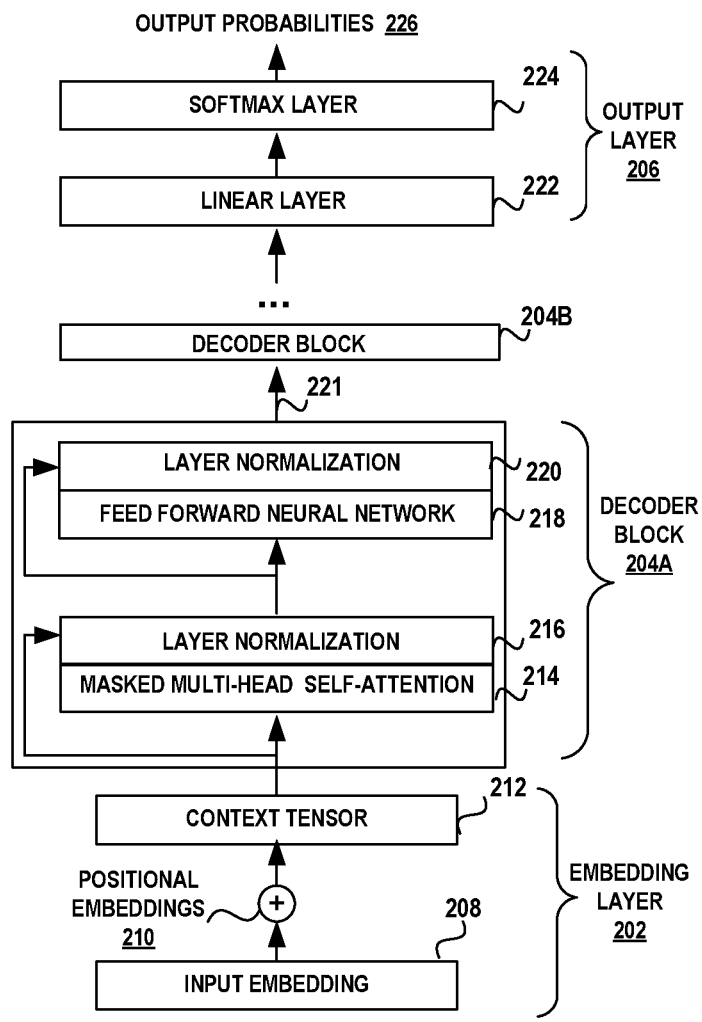
FIG. 2 is a schematic diagram illustrating an exemplary configuration of a neural decoder transformer model with attention.

FIG. 2 illustrates an exemplary structure of the syntax and semantic aware decoder as a neural decoder transformer model. In one aspect, the neural decoder transformer model 200 includes an input or embedding layer 202, one or more decoder blocks 204A, 204B ("204"), and an output layer 206.

A decoder block 204 consists of two layers. The first layer includes a masked multi-head self-attention component 214 followed by a layer normalization component 216. The input to the masked multi-head self-attention component 214 has a residual connection to layer normalization 216. The output of layer normalization 216 is input into the feed forward neural network 218 with a residual connection to layer normalization component 220. The output of the feed forward neural network 218 is input to a layer normalization component 220. The output of the decoder block 204 is a set of hidden representations 221. The set of hidden representations 221 is then sent through additional decoder blocks, if multiple decoder blocks exist.

Attention is used to decide which parts of the input sequence are important for each subtoken, especially when decoding long sequences since the decoder is limited to encoding a fixed-size vector. Attention mechanisms gather information about the relevant context of a given subtoken which is used to identity the relationships between tokens in the long sequence while ignoring other tokens that do not have much bearing on a given prediction.

The masked multi-head self-attention component 214 takes a context tensor 212 and weighs the relevance of each token embedding represented in the context tensor to each other by generating attention weights for each token embedding in the input embedding 208. In one aspect, the attention function is scaled dot-product attention which is described mathematically as follows:

$$\text{Attention } (Q, K, V) = \text{softmax}\left(\frac{QK^T}{\sqrt{d_k}}\right) V,$$

where the input consists of queries Q and keys K of dimension $d_k$, and values V of dimension $d_v$. Q is a matrix that contains the query or vector representation of one subtoken in a sequence, K is the vector representations of all tokens in the sequence, and V is the vector representations of all the subtokens in the sequence.

The queries, keys and values are linearly projected h times in parallel with ok output values which are concatenated to a final value:

$$\text{MultiHead}(Q,K,V)=\text{Concat}(\text{head}_1, \ldots, \text{head}_h)W^O,$$

where $\text{head}_i = \text{Attention}(QW_i^Q, KW_i^K, VW_i^V)$,
with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

After the initial time step, the masked multi-head self-attention component 214 receives the output embeddings of the previous timestep. The masked multi-head self-attention component 214 masks the output embeddings from future time steps. The feed-forward neural network 218 processes each output encoding separately. A layer normalization component 216, 220 is used between the layers in order to normalizes the inputs across the features.

The output layer 206 includes a linear layer 222 and a softmax layer 224. The linear layer 222 projects the vector produced by the stack of decoders into a logits vector. The softmax layer 224 then turns the scores of the logits vector into probabilities for each token in the vocabulary which are positive and normalized.

The neural decoder transformer model with attention is trained on a training dataset from a large corpus of source code programs. Each source code program in the training dataset does need not be written in the same programming language. The training dataset may be composed of numerous source code programs, each of which may be written in a different programming language. Each source code program in the training dataset is encoded into a sequence composed of tokens and/or subtokens. The frequently-used elements in a programming language are encoded into tokens and the less frequently-occurring elements are encoded into combinations of characters referred to as subtokens. This reduces the need to store a large vocabulary and provides better accuracy for out-of-vocabulary tokens.

From the training dataset, the model learns the syntactic structure of source code and how to predict the mostly likely sequence of tokens to complete a partially-formed code fragment. In some situations, the model may be further fine-tuned with source code tailored for a specific task in order adjust the parameters of the model for the specific task.

Methods

Attention now turns to a more detailed description of the methods used in the system for constrained decoding for source code generation and translation. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
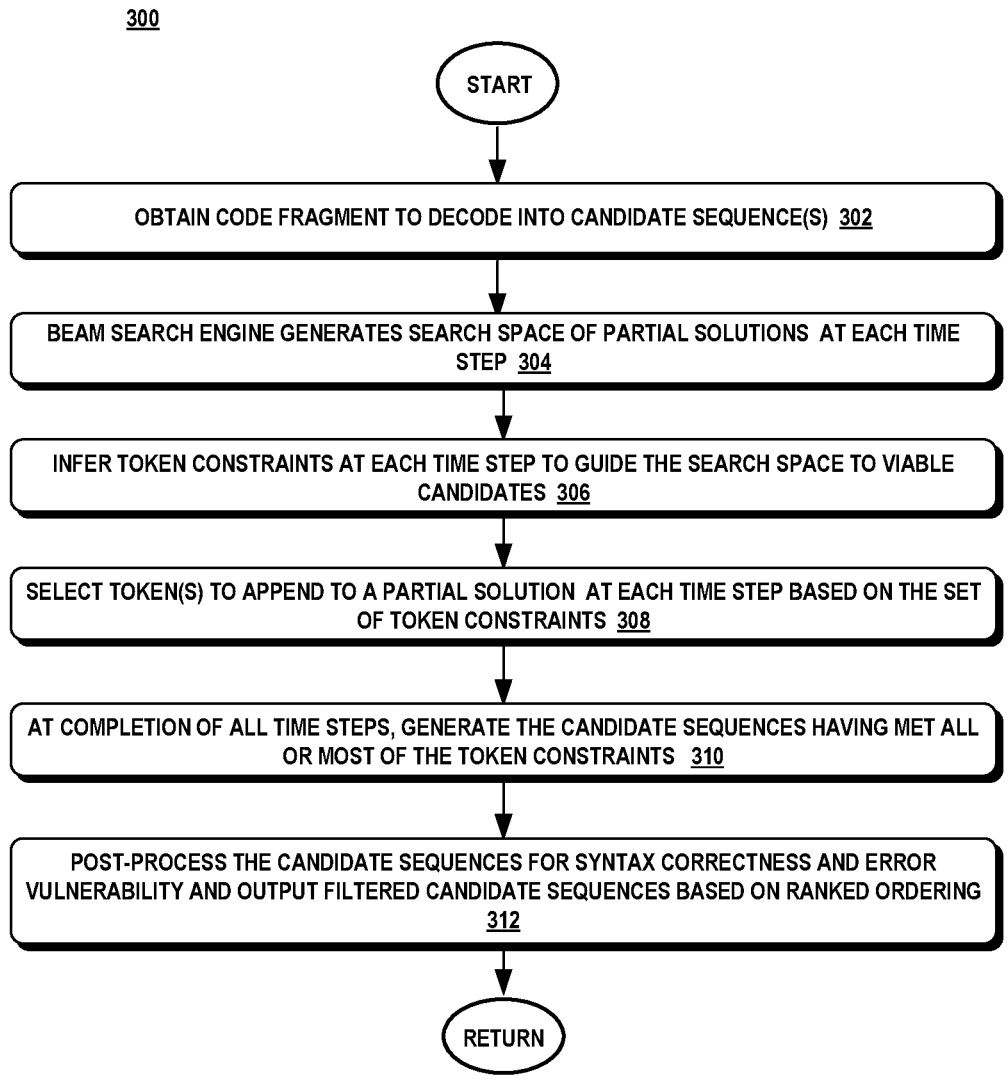
FIG. 3 is a flow chart illustrating a first exemplary method of a syntactic and semantic aware constrained decoding method.

Turning to FIG. 3, there is shown an exemplary method of constrained decoding for source code generation. A code fragment or input sequence is obtained that is decoded for a code generation task with an initial set of token constraints. A token constraint is a token, an ordered sequence of tokens or a list of token values (e.g., types) that should appear in the candidate sequence. (Collectively, block 302).

The input sequence is input to a beam search engine that uses the decoder neural transformer model to generate a search space of partial solutions to complete the code fragment at each time step. The beam search engine employs a beam search to generate the search space (block 304).

At each time step, the beam search engine infers or predicts new token constraints in order to narrow or prune the search space to more viable candidates. The new token constraints are predicted from static analysis code tools that analyze the partial solutions as they are generated at each time step of the beam search. The initial constraints are typically user-defined and preconfigured before the beam search starts. The static analysis tools run in the background of a source code editor and get a peek into the beam search at each time step. The tools guide the beam search to select a next best token for a partial solution that is more likely to produce a viable candidate sequence instead of relying only on the decoder's output probabilities. (Collectively, block 306).

The new token constraints are obtained from the static type code analyzer, the interprocedural code analyzer, and/or a production rule generator. (Collectively, block 306). At each time step, the initial and new constraints are used to select the next token or tokens for each of the existing partial solutions (block 308). The beam search engine concludes the beam search at the completion of all the time steps or until the end-of-sequence token is determined to be the next best token (block 310). At the completion of the beam search, the candidate sequences are output to the post-processing engine (block 312).

In an aspect, the post-processing engine receives the local and extended context of the input sequence and analyzes the candidate sequences for syntactic correctness and error vulnerability within the local and extended context. Those candidates which cannot compile successfully are eliminated in addition to those candidates that are flagged with error vulnerabilities. The remaining candidates are ranked based on how well the candidate sequence passes the tests. (Collectively, block 312).

Figure 4:
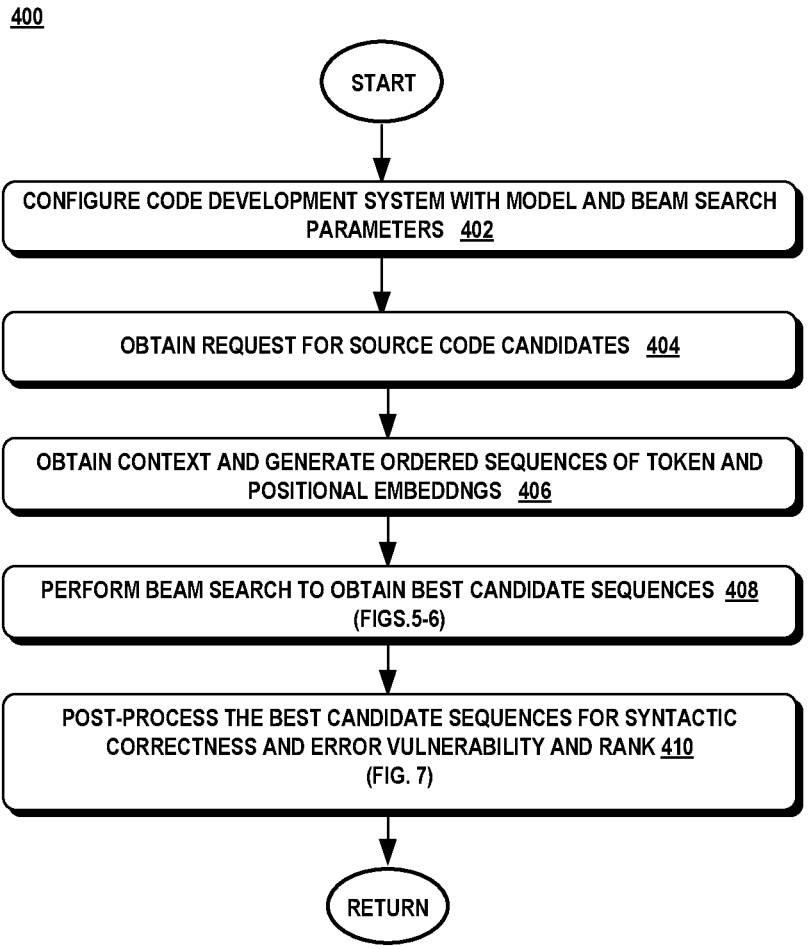
FIG. 4 is a flow chart illustrating a second exemplary method of a syntactic and semantic aware constrained decoding method.

FIG. 4 illustrates another aspect of a method of constrained decoding for source code generation 400. In this aspect, a software development system uses the constrained decoding process to generate candidates to complete a code fragment. Software development environments are often used to aid software developers (i.e., users, programmers, etc.) to develop program code. The software development system may include a source code editor and other tools that a developer utilizes to write and test their programs. Some software development systems include a code completion feature that provides assistance while the developer is editing code by automatically presenting a list of possible candidates based on one or more characters (e.g., letters, symbols, etc.) that a developer has typed into a source code editor. A popup menu may appear with several suggested code elements that the developer may utilize. This assistance is beneficial since it speeds up the development time and reduces common errors, such as typos.

In one aspect, the source code editor runs a background process to monitor the characters input by a user into a source code program in the editor. The background process continuously updates a syntax tree representing the source code program based on the user's actions in the editor. As the user is typing in the characters, the code completion engine generates the most likely candidates to complete the current code context using a beam search and the neural decoder transformer model. The candidates are presented to the developer. The developer may select one of the candidates which is input into the source code program under development.

Turning to FIG. 4, the code completion system is configured with the neural decoder transformer model and the beam search parameters. The beam search parameters include a beam size, the initial constraints, and the termination condition. The beam size is the number of partial solutions that are evaluated at each time step. The termination condition indicates how the beam search ends which may be based on a maximum length of a candidate sequence or when a particular end token (e.g., end-of-method, end-of-line, end-of-program) is predicted as the most likely next token and most constraints have been met (Collectively, block 402).

The code completion system will receive a request for a candidate sequence with a context which is the current state of the code in the editor at the point the request is made (block 404). The code completion system transforms the context into an input sequence of token embeddings and an input sequence of positional embeddings (block 406) and invokes the beam search to predict a list of candidate sequences to complete the code fragment (block 408). The candidate sequences that are generated by the beam search are then analyzed for syntactic correctness and error vulnerability. Those candidates that fail the syntactic correctness and error vulnerability tests are eliminated and the remaining candidates are output in a ranked order (block 410).

Beam Search

The constrained-decoding beam search generates a beam at each time step t, where a beam includes a set of partial solutions, otherwise referred to as hypotheses. A hypothesis is a partial solution composed of an ordered sequence of tokens. The beam size, k, is the number of hypotheses generated at each time step.

A partial solution is constructed from the tokens having the highest probabilities generated from the model's output probability distribution. However, the partial solution, at each time step, may be incorrect syntactically or may not lead to a viable solution. For this reason, the beam search obtains additional token constraints at each time step to prune the search space of partial solutions. The additional token constraints are generated from the static analytic tools that run as background processes. The static analysis tools provide the beam search with guidance on how to select the next token for each partial solution at each time step. For example, a syntax check on the current state of a hypothesis may require a closing parenthesis. By way of another example, take the case where there is a method invocation that is part of a partial solution. In order for the partial solution to be type-correct, the type of the receiver token is needed. The static type analyzer may generate a list of token constraints for the receiver token based on the type determined by the static type analyzer.

A token constraint or constraint may be a single token, an ordered sequence of tokens, or a list of values for a token (e.g., types). The token constraints are added to the set of next best tokens to be appended to a partial solution at each time step. The set of next best tokens includes the top-k tokens identified from the model's output probability distribution and all unmet token constraints. However, increasing the number of token constraints will increase the number of partial solutions generated by the beam search and increase its computational complexity. In order to limit the number of partial solutions, a set of banks, $B_0$, $B_1$, $B_C$, is used to track the number of token constraints each partial solution has met. For C token constraints, each bank $B_i$ groups together partial solutions that have met the same number of token constraints. For instance, $B_0$ includes all the partial solutions that not met any token constraints, $B_1$ includes all the partial solutions having one token constraint met, and $B_C$ includes all the partial solutions having met most token constraints. The beam search then chooses one partial solution from each bank to expand at a time step. In this manner, the number of partial solutions N, at each time step, is bounded to N<2*k+C which is manageable. The number of banks corresponds to a given number of constraints and the size of each bank which is set to floor (k/C) irrespective of the time step t. The floor function gives the greatest integer less than or equal to k/C.

The top-k tokens are selected from the probability distribution generated by the decoder that indicates the probability that each token in likely to follow the immediately preceding sequence of tokens in a partial solution. The probability distribution for each hypothesis in a beam is contained in a scores matrix. The size of the scores matrix is $k \times V_T$, where k is the beam size and $V_T$ is the size of the token vocabulary.

Some token constraints may be known before the decoding process starts. For instance, a static code analyzer may require the presence of a code token or an n-gram in the output of the model detected from analyzing the sequence of tokens in a partial solution. An n-gram is an ordered sequence of n tokens. Likewise, a data flow analysis may require the presence of a certain token in a partial solution.

There are various types of token constraints. A hard constraint requires the presence of a specific token or an ordered sequence of tokens. A hard single constraint is a single token c that must appear in order for a partial solution to have met the constraint. A hard multi-token or n-gram constraint C={c0, c1, c2} is used to generate at least one partial solution that contains the multiple tokens in the order they appear in the constraint. The hard multi-token constraint is considered met if the partial solution contains all the tokens {c0, c1, c2} in order. A soft constraint does not require the presence of specific tokens rather only requires that a generated token belong to a set of possible tokens. The soft constraint is met if there is at least one partial solution having at least one token from the set of soft constraints.

The beam search iterates for each time step until the maximum token length for the output sequence is reached or the end-of-sequence token is determined to be the next best token and all the constraints have been met. Those partial solutions that have met all or most of the constraints are output as the candidate sequences.

Figure 5:
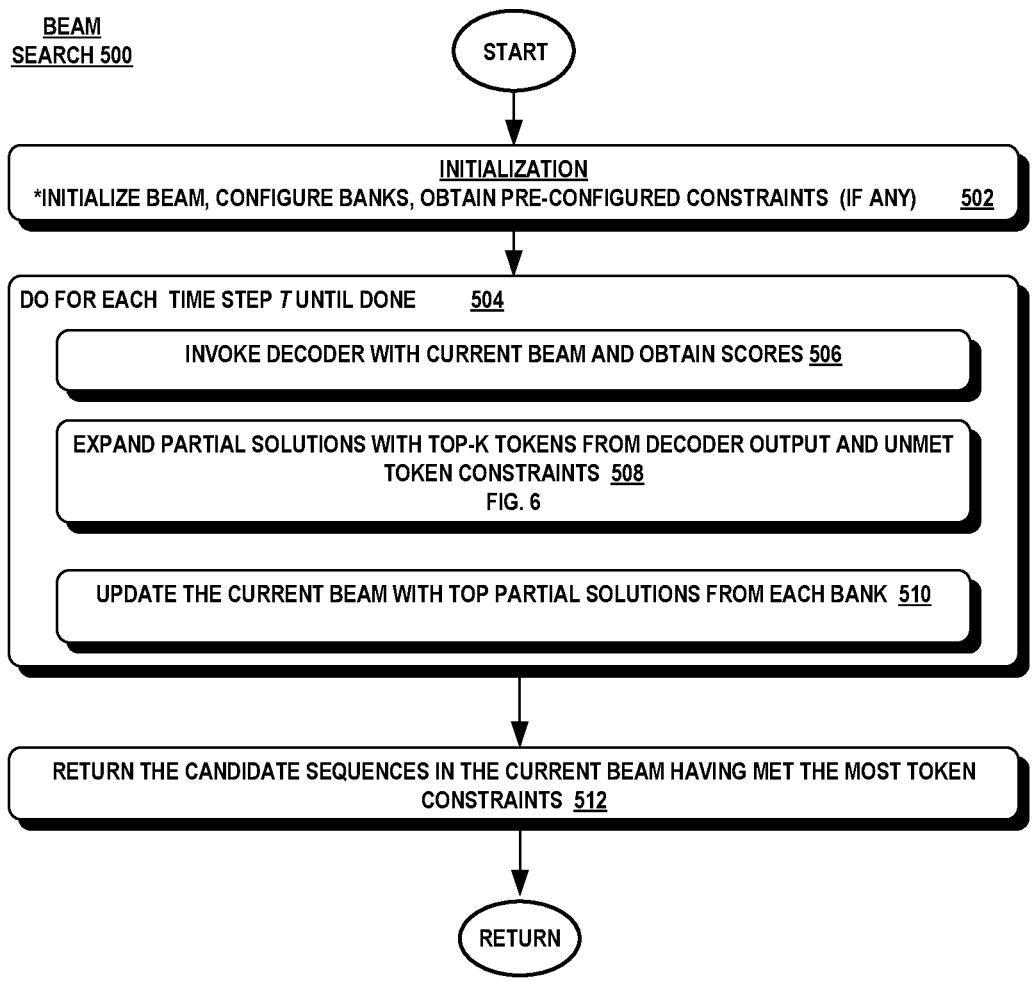
FIGS. 5 and 6 are flow charts illustrating an exemplary method of a beam search using syntactic and semantic aware constrained decoding.

Turning to FIG. 5, there is shown an exemplary method of the constrained-decoding beam search. Initially, the beam search may be given a set of hard constraints before the search begins and the size of the banks are configured (block 502). The neural decoder transformer model is invoked to generate an initial beam given an input sequence of tokens (block 502). The initial beam is composed of the top k tokens from the model's vocabulary having the highest probabilities (block 502).

At each subsequent time step t (block 504), the next beam is generated by invoking the decoder with the current beam to generate a new output probability distribution or scores matrix (block 506). The beam search determines the next best token to append to each partial solution or hypothesis in the current beam based on the scores matrix and the set of token constraints (block 508). The set of token constraints includes newly added constraints inferred by one or more static analysis tools using the partial solutions generated at the current time step (block 508). The current beam is updated to include an expanded partial solution from each bank (block 510). At the end of the last time step, the partial solutions from the current beam that meet most of the token constraints are output as candidate sequences (block 512).

Figure 6:
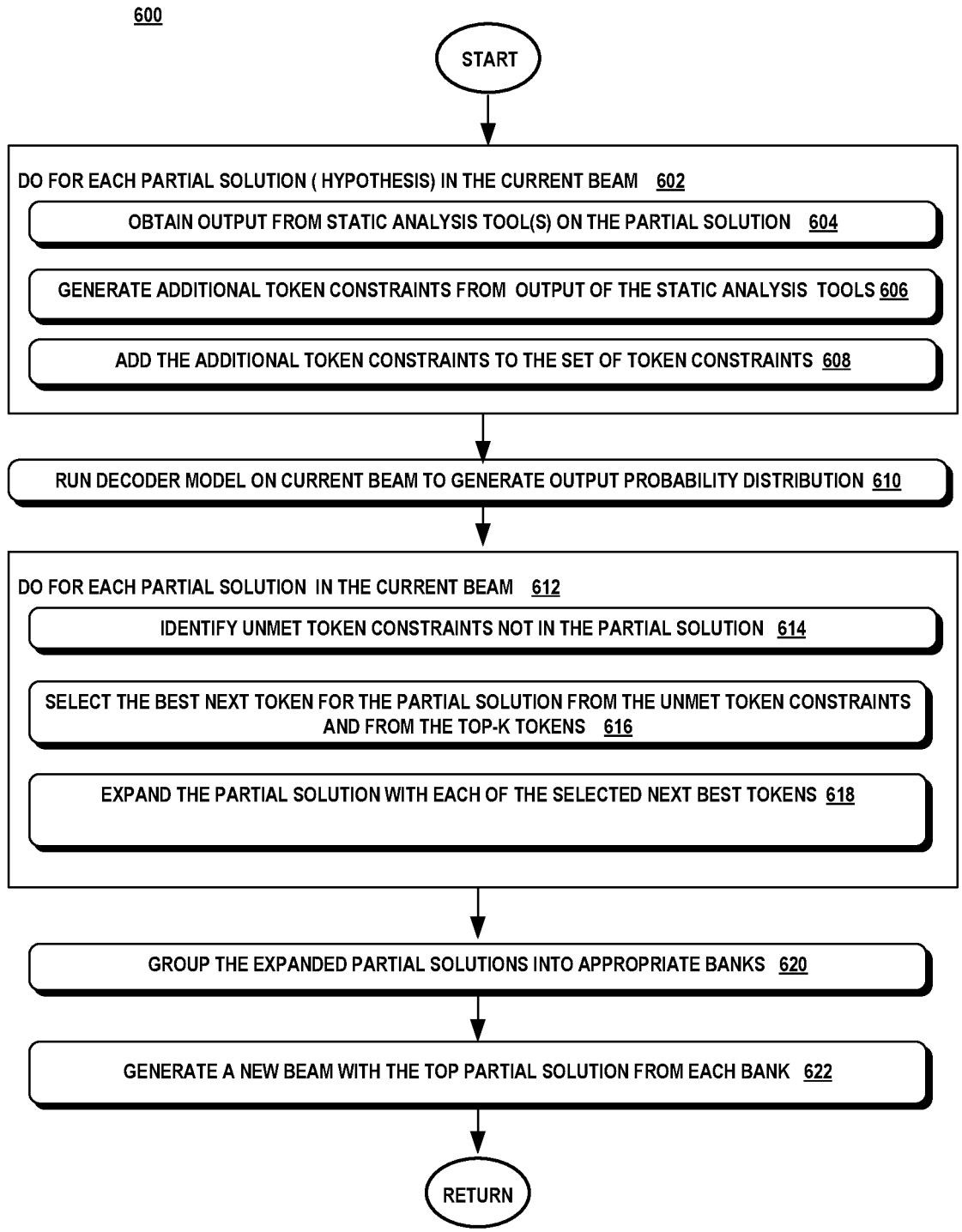

Turning to FIG. 6, there is shown an exemplary method 600 of constrained decoding. For each partial solution or hypothesis in the current beam (block 602), one or more static analysis tools, running in a background process, provides output on the partial solution (block 604). The output identifies additional token constraints particular to the partial solution (block 606). These additional token constraints are added to the existing set of token constraints (block 608).

The neural decoder transformer model is run on the current beam to generate an output probability distribution that identifies the most likely tokens to append to each partial solution. The tokens having the top-k probabilities are selected to expand a partial solution. (Collectively, block 610).

For each partial solution in the current beam (block 612), the next best token to expand a partial solution is determined (blocks 614-618). The selection of the next best token considers all unmet token constraints currently not in a partial solution (block 614) and the tokens having the top-k probability computed by the neural decoder transformer model (block 616). Each partial solution is expanded with its next best tokens (block 618).

The expanded partial solutions are then grouped into an appropriate bank based on the number of constraints met in the expanded partial solution (block 620). A new beam is generated by selecting the top partial solution from each bank, where the banks having the most constraints satisfied are prioritized (block 622).

Filtering and Ranking of Candidate Sequences

Figure 7:
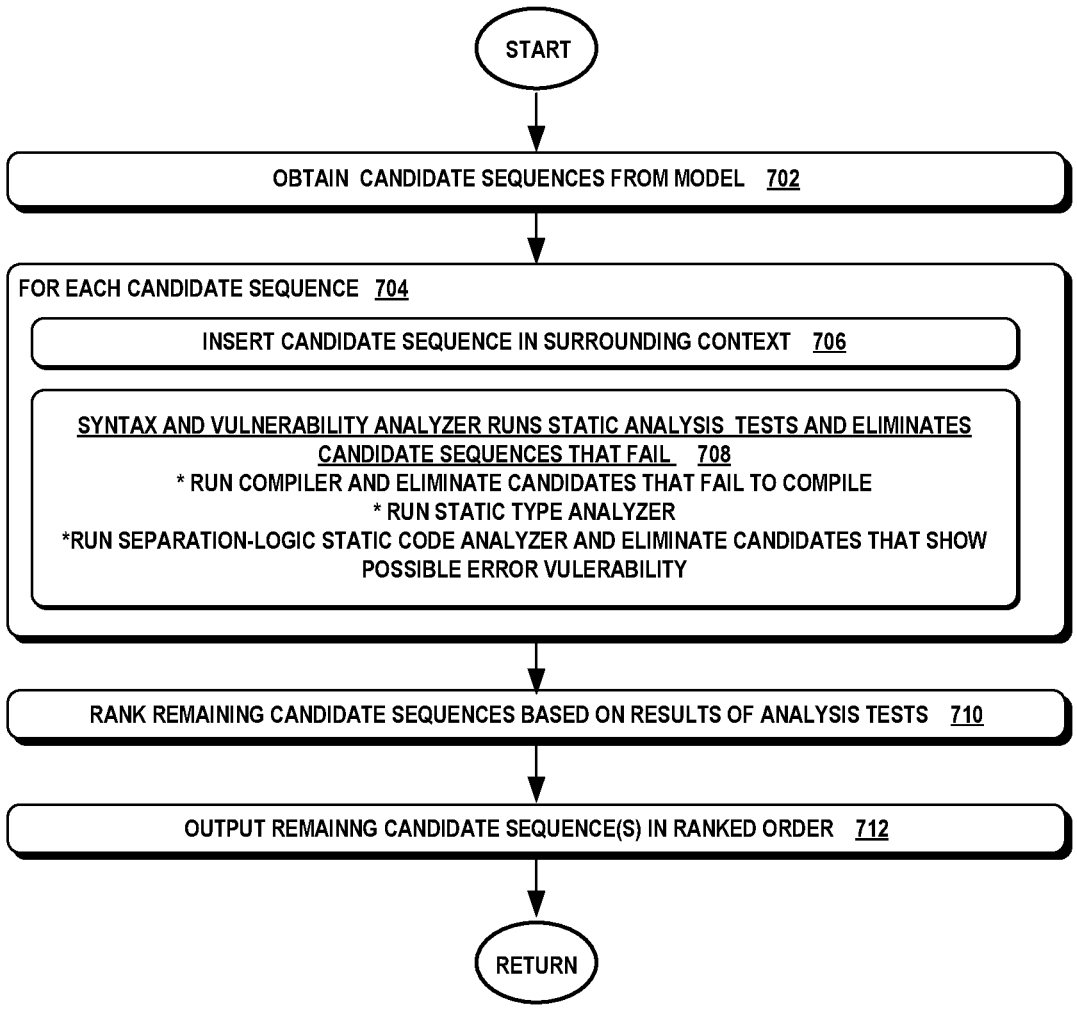
FIG. 7 is a flow chart illustrating an exemplary method of the post-processing of the candidate sequences generated by the syntactic and semantic aware constrained decoding.

After the candidate sequences are generated, the post-processing engine analyzes each of the candidate sequences against a series of static tests and eliminates those candidate sequences that fail. Turning to FIG. 7, there is shown an exemplary method 700 for analyzing the best candidate sequences. The best candidate sequences output from the beam search engine are output to the syntax and error-vulnerability analyzer (block 702). For each of the candidate sequences (block 704), the post-processing engine inserts the surrounding context into the candidate sequence which includes the source code immediately surrounding the source code input to the beam search and external source code included in import statements (block 706).

The syntax and vulnerability analyzer runs a series of tests for each candidate sequence (block 708). The series of tests include compilation of a candidate sequence in its surrounding context through a compiler or compilation tool, testing that the compiled code works in a build environment, performing a static type check analysis on the candidate sequence to check if the code sequence contains any out-of-scope types, and analyzing the candidate sequence for error vulnerabilities using the separation-logic static code analyzer. If the separation-logic static code analyzer finds any security-critical risks, the relevant candidate sequence is eliminated. All remaining candidate sequences are ranked based on results of the static analysis tests (block 710). The less syntax error and vulnerabilities found, the higher the candidate sequence is ranked (block 710) and output in the ranked order (block 712).

Exemplary Operating Environments

Figure 8:
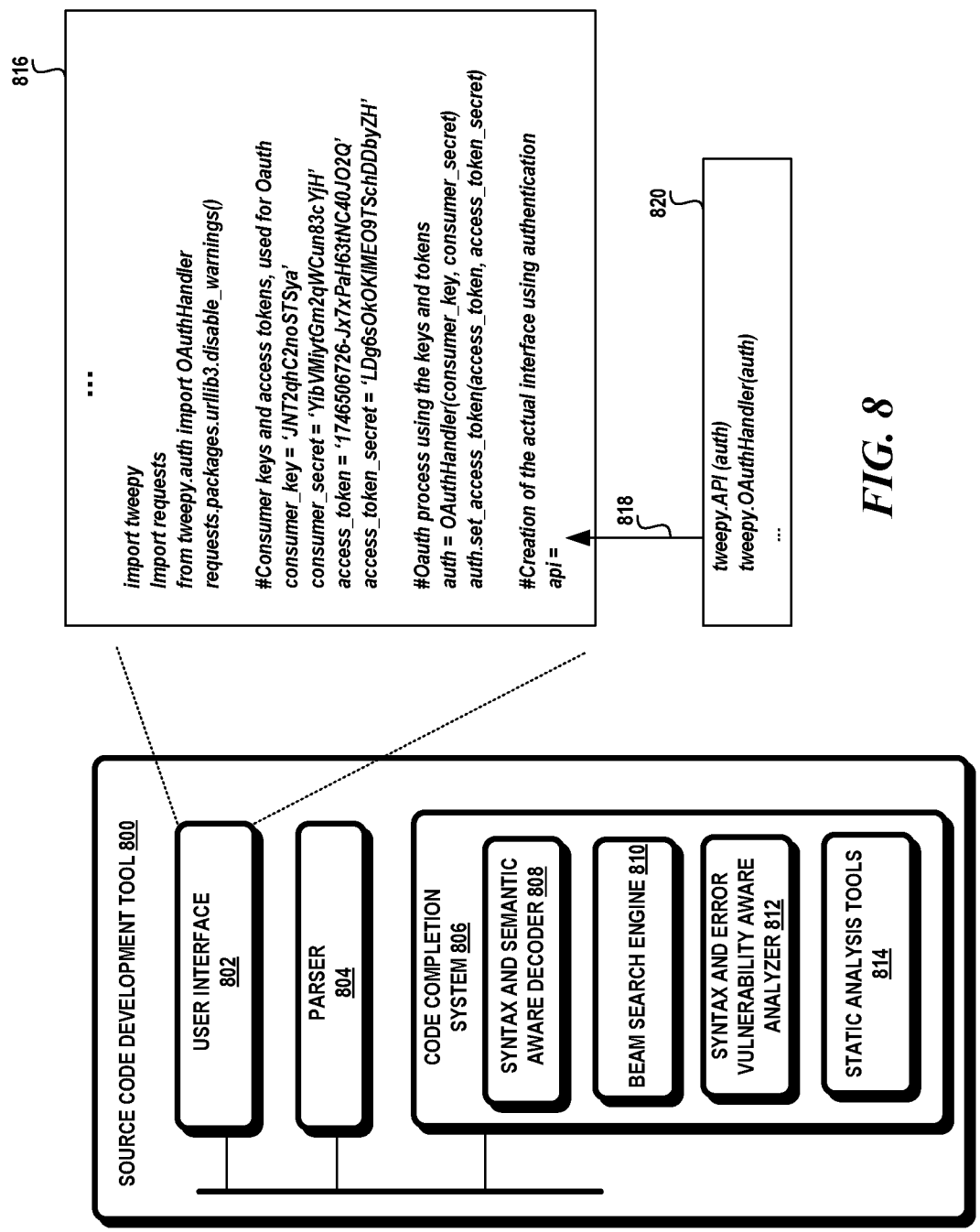
FIG. 8 is a block diagram illustrating a first exemplary operating environment.

In one aspect, the syntax and semantic aware constrained decoder is used in a code completion system. Referring to FIG. 8, the decoder may be embodied as a function or feature integrated into a source code development tool 800, such as source code editor, integrated development environment (IDE), browser, and/or stand-alone application. Code completion may be embodied as a tool or feature that can be an add-on, plug-in, extension and/or component of a source code editor, browser, application, and/or IDE. In one aspect, a source code development tool 800 may include a user interface 802, a parser 804, and a code completion system 806 that includes the syntax and semantic aware decoder 808, a beam search engine 810, a syntax and error vulnerability analyzer 812, and the static analysis tools 814.

The user interface 802 includes a set of features or functions for developing (e.g., writing, editing, testing) a source code program. The user interface 802 may include a window 816 that displays the source code currently in the source code development tool 800. The user interface may utilize a pop-up window 820 to present possible candidate sequences for completion thereby allowing a developer to browse through the candidates and to select one from the list. Alternatively, the candidate sequences may appear as a continuation of the current source code program.

The parser 804 monitors characters input into the source code development tool 800 and generates a corresponding syntax tree. The parser 804 also updates the syntax tree as the developer creates and edits the source code in the source code development tool 800.

At certain points in the editing process, the user interface 802 will request candidates from the code completion system 806 to complete the code fragment. The code completion system 806 extracts tokens from the concrete syntax tree and generates a context tensor representing the input sequence as noted above. The code completion system 806 performs a beam search until a termination condition is reached. The top k candidate sequences are returned to the user interface 802.

If the developer wants to accept the candidate sequence, the developer may type in a particular keystroke or combination of keystrokes to accept the candidate sequence which is then automatically inserted into the source code program.

There is shown in FIG. 8, an exemplary source code program 816 in a source code development tool 800. The code completion system 806 decodes the program to predict candidate sequences to complete the partially-formed line-of-code "api=" at position 818. In this example, the decoding starts without any constraints and after three time steps of the beam search, the top hypothesis is ["twee", "py", "."]. A static analysis tool 814 running in the background detects a method invocation expression and infers the type of the receiver token as "tweepy." The tool 814 suggests a soft constraint requiring the next token to be one of: [API, OAuthHandler, client, AppAuthHandler, Paginator, cursor, . . . ]. The beam search engine 810 outputs the top candidate solutions which are "tweepy.API(auth)" and "tweepy.OAuthHandler(auth)" which have met the soft constraints.

Figure 9:
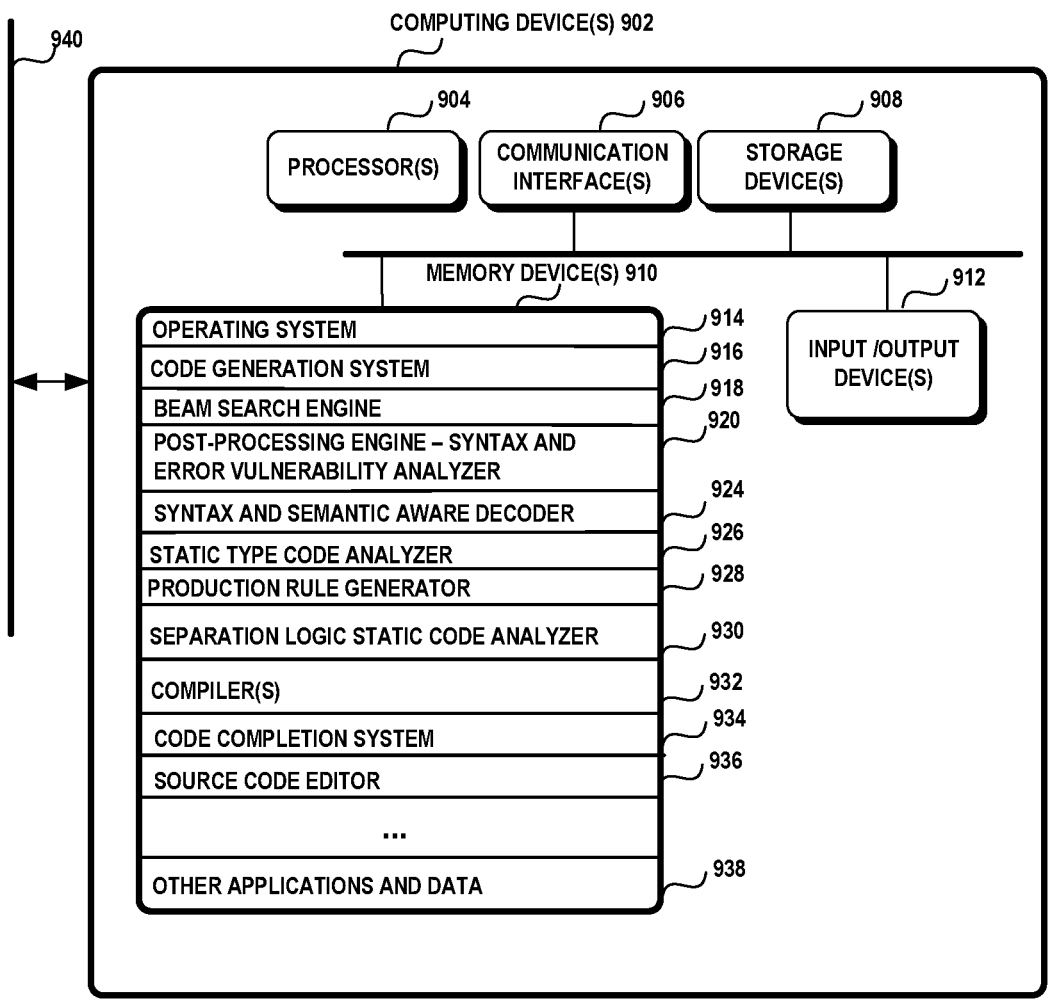
FIG. 9 is a block diagram illustrating a second exemplary operating environment.

Attention now turns to a discussion of another exemplary operating environment. FIG. 9 illustrates an exemplary operating environment 900 in which one or more computing devices 902 are used in the constrained decoding process. However, it should be noted that the aspects disclosed herein is not constrained to any particular configuration of devices. Computing devices 902 may be configured as a cloud service that generates the decoder as a service that is distributed to end users, as a cloud service that performs the constrained decoding as a cloud service, and/or performs the code completion as a service or part of an application. It should be noted that the operating environment is not limited to any particular configuration and other configurations are possible.

A computing device 902 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 900 may be configured in a network environment, a distributed environment, a multi-processor environment, or a stand-alone computing device having access to remote or local storage devices.

The computing device 902 may include one or more processors 904, one or more communication interfaces 906, one or more storage devices 908, one or more memory devices 910, and one or more input/output devices 912. A processor 904 may be any commercially available or customized processor and may include dual microprocessors and multi-processor architectures. A communication interface 906 facilitates wired or wireless communications between the computing device 902 and other devices. A storage device 908 may be computer-readable medium that does not contain propagating signals, such as modulated data signals transmitted through a carrier wave. Examples of a storage device 908 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 908 in the computing device 902. The input/output devices 912 may include a keyboard, mouse, pen, voice input device, touch input device, display, speakers, printers, etc., and any combination thereof.

A memory device or memory 910 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 910 may also include one or more external storage devices or remotely located storage devices that do not pertain to propagated signals, such as modulated data signals transmitted through a carrier wave.

The memory device 910 may contain instructions, components, and data. A component is a software program that performs a specific function and is otherwise known as a module, program, component, and/or application. The memory device 910 may include an operating system 914, a code generation system 916, a beam search engine 918, a post-processing engine for syntax and error vulnerability analysis 920, a syntax and semantic-aware decoder 924, a static type code analyzer 926, a production rule generator 928, a separation-logic static code analyzer 930, one or more compilers 932, a code completion system 934, a source code editor 936 and other applications and data 938.

The computing devices 902 may be communicatively coupled via a network 940. The network 940 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 940 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of minimizing the amount of computing resources and execution time needed to execute a beam search to generate source code. The technical features associated with addressing this problem are the dynamically-generated token constraints that are created at each time step of the beam search, to more particularly guide the beam search towards generating viable candidate sequences. The technical effect achieved is the reduction of the search space to more viable candidate sequences resulting in the reduction of the computing resources and execution time needed to perform the search and to develop source code.

CONCLUSION

A system is disclosed having one or more processors; and a memory. The memory stores one or more programs that are configured to be executed by the one or more processors. The one or more programs including instructions to perform acts that: access sequence data representing a partially-formed source code fragment requiring decoding into a completed source code fragment; generate a plurality of partial solutions as candidates to complete the partially-formed source code fragment, a partial solution including an ordered sequence of tokens, wherein a token is conditioned on a previously-generated token; obtain one or more token constraints from a static code analysis of each partial solution; execute a deep learning decoder model to predict token probabilities for each partial solution; generate next tokens to append to each partial solution from the token probabilities and from the one or more token constraints; expand each partial solution with the next tokens; and select one or more partial solutions having met most of the token constraints as candidate sequences to complete the partially-formed source code fragment.

In an aspect. the static code analysis is based on correct type usage. In an aspect, the static code analysis is based on compliance with production rules of a grammar of a programming language of the source code fragment. In an aspect, the static code analysis is based on syntax correctness. In an aspect, the token constraint requires the next token to belong to a list of type values, requires the next token to be a specific token or requires the next token to be part of an n-gram of tokens.

In an aspect, the one or more programs include instructions to perform acts that: test the candidate sequences for security vulnerabilities and/or syntax correctness; and eliminate the candidate sequences that fail the security vulnerability test and/or syntax correctness test. In an aspect, the one or more programs include instructions to perform acts that: rank the candidate sequences based on outcome of passing syntax and/or error vulnerability tests.

A computer-implemented method is disclosed, comprising: obtaining sequence data representing a source code fragment requiring decoding into one or more candidate sequences; obtaining a plurality of partial solutions for the one or more candidate sequences, a partial solution including an ordered sequence of tokens, wherein each token is conditioned on a previously-generated token; generating next tokens to append to each partial solution from top-k token probabilities predicted from a deep learning decoder model and from one or more token constraints predicted by a static code analysis for each partial solution; expanding each partial solution with the next tokens; and selecting at most one candidate sequence for the source code fragment from the expanded partial solutions having met most of the token constraints.

In an aspect, the static code analysis is based on correct type usage. In an aspect, the static code analysis is based on compliance with production rules of a grammar of a programming language of the source code fragment. In an aspect, the static code analysis is based on syntax correctness.

In an aspect, the computer-implemented method, further comprises: ranking the at least one candidate sequence based on outcome of passing syntax and/or error vulnerability tests. In an aspect, the computer-implemented method, further comprises: testing the at least one candidate sequence for error vulnerabilities and/or syntactic correctness; and eliminating each of the at least one candidate sequence that fails the error vulnerability test and/or syntactic correctness test. In an aspect, the token constraint requires the next token to be a specific token, an n-gram, or tokens having a type from a list of token types.

A computer-implemented method is disclosed, comprising: receiving an ordered sequence of tokens representing a partially-formed source code fragment requiring decoding into a completed source code snippet; creating a search space of partial solutions as candidates to complete the partially-formed source code fragment, wherein a partial solution includes an ordered sequence of tokens, wherein a token in the ordered sequence is conditioned on a previously-generated token; dynamically generating token constraints from a static code analysis of each partial solution; employing a deep learning decoder model to generate token probabilities, a token probability indicating a likelihood of a token following a previously-generated token; selecting the next token to append to each of the partial solutions from the token constraints and token probabilities output from the deep learning decoder model; searching the search space for one or more partial solutions that contain most of the token constraints; and selecting, from the one or more partial solutions, the selected partial solutions to complete the partially-formed source code fragment.

In an aspect, the token constraint requires the next token to belong to a list of type values. In an aspect, the token constraint requires the next token to be a specific token. In an aspect, the token constraint requires the next token to be part of an ordered sequence of tokens.

In an aspect, the computer-implemented method, further comprises: testing the selected partial solutions for syntactic correctness and security vulnerabilities; and ranking the selected partial solutions based on outcome of the testing. In an aspect, the computer-implemented method, further comprises: testing the selected partial solutions for syntactic correctness and security vulnerabilities; and eliminating the selected partial solutions that fail the testing.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system, comprising:
one or more processors; and
a memory that stores one or more programs that are configured to be executed by the one or more processors, the one or more programs including instructions to perform acts that:
access sequence data representing a partially-formed source code fragment requiring decoding into a completed source code fragment;
generate a plurality of partial solutions as candidates to complete the partially-formed source code fragment, wherein a partial solution comprises an ordered sequence of tokens, wherein a token is conditioned on a previously-generated token;
obtain one or more token constraints for a select one of the plurality of partial solutions, wherein a token constraint identifies whether a next token should appear in the select partial solution based on a source code static analysis of the select partial solution;
execute a deep learning decoder model to predict token probabilities for the select partial solution;
generate the next token to append to the select partial solution from the token probabilities and from the one or more token constraints;
expand the select partial solution with the next token; and
select one or more partial solutions having met most of the token constraints as candidate sequences to complete the partially-formed source code fragment.

2. The system of claim 1, wherein the source code static analysis is based on correct type usage.

3. The system of claim 1, wherein the source code static analysis is based on compliance with production rules of a grammar of a programming language of the partially-formed source code fragment.

4. The system of claim 1, wherein the source code static analysis is based on syntax correctness.

5. The system of claim 1, wherein the one or more token constraints requires the next token to belong to a list of type values, requires the next token to be a specific token or requires the next token to be part of an n-gram of tokens.

6. The system of claim 1, wherein the one or more programs include instructions to perform acts that:
test the candidate sequences for security vulnerabilities and/or syntax correctness; and
eliminate the candidate sequences that fail the security vulnerability test and/or syntax correctness test.

7. The system of claim 1, wherein the one or more programs include instructions to perform acts that:
rank the candidate sequences based on outcome of passing syntax and/or error vulnerability tests.

8. A computer-implemented method, comprising:
obtaining sequence data representing a source code fragment requiring decoding into one or more candidate sequences that complete the source code fragment;
obtaining a plurality of partial solutions for the one or more candidate sequences, wherein a partial solution comprises an ordered sequence of tokens, wherein each token of the ordered sequence of tokens is conditioned on a previously-generated token;
generating a next token to append to each partial solution from top-k token probabilities predicted from a deep learning decoder model and from one or more token constraints predicted by a source code static analysis for each partial solution, wherein a token constraint indicates whether a next token predicted from the deep learning decoder model is syntactically correct for a select one of the plurality of partial solutions;
expanding each partial solution with a respective next token; and
selecting from the one or more candidate sequences, a select candidate sequence for the source code fragment from the expanded partial solutions having met most of the one or more token constraints.

9. The computer-implemented method of claim 8, wherein the source code static analysis is based on correct type usage.

10. The computer-implemented method of claim 8, wherein the source code static analysis is based on compliance with production rules of a grammar of a programming language of the source code fragment.

11. The computer-implemented method of claim 8, wherein the soruce code static analysis is based on detection of a software vulnerability.

12. The computer-implemented method of claim 8, further comprising:
ranking the one or more candidate sequences based on outcome of passing syntax and/or error vulnerability tests.

13. The computer-implemented method of claim 8, further comprising:
    testing the one or more candidate sequences for error vulnerabilities and/or syntactic correctness; and
    eliminating each of the one or more candidate sequences that fail the error vulnerability test and/or syntactic correctness test.

14. The computer-implemented method of claim 8, wherein the one or more token constraints require the next token to be a specific token, an n-gram, or tokens having a type from a list of token types.

15. A computer-implemented method, comprising:
    receiving an ordered sequence of tokens representing a partially-formed source code fragment requiring decoding into a completed source code snippet;
    creating a search space of partial solutions as candidates to complete the partially-formed source code fragment, wherein a partial solution includes an ordered sequence of tokens, wherein a token in the ordered sequence is conditioned on a previously-generated token;
    dynamically generating token constraints from a source code static analysis of each partial solution, wherein a token constraint checks whether or not a next token is feasible to be appended to a respective partial solution to maintain syntax correctness;
    employing a deep learning decoder model to generate token probabilities, wherein a token probability represents a likelihood of a respective next token following a respective previously-generated token;
    selecting the next token to append to each of the partial solutions from the token constraints and from the token probabilities output from the deep learning decoder model;
    searching the search space for one or more partial solutions that contain most of the token constraints; and
    selecting, from the one or more partial solutions, selected partial solutions to complete the partially-formed source code fragment.

16. The computer-implemented method of claim 15, wherein the token constraint requires the next token to belong to a list of type values.

17. The computer-implemented method of claim 15, wherein the token constraint requires the next token to be a specific token.

18. The computer-implemented method of claim 15, wherein the token constraint requires the next token to be part of an ordered sequence of tokens.

19. The computer-implemented method of claim 15, further comprising:
    testing the selected partial solutions for security vulnerabilities; and
    ranking the selected partial solutions based on outcome of the testing.

20. The computer-implemented method of claim 15, further comprising:
    testing the selected partial solutions for security vulnerabilities; and
    eliminating the selected partial solutions that fail the testing.

* * * * *